Aug. 19, 1952   V. T. HOEFLICH   2,607,162
MOUTHPIECE FOR SOUND-PRODUCING DEVICES
Filed Feb. 7, 1947   2 SHEETS—SHEET 1
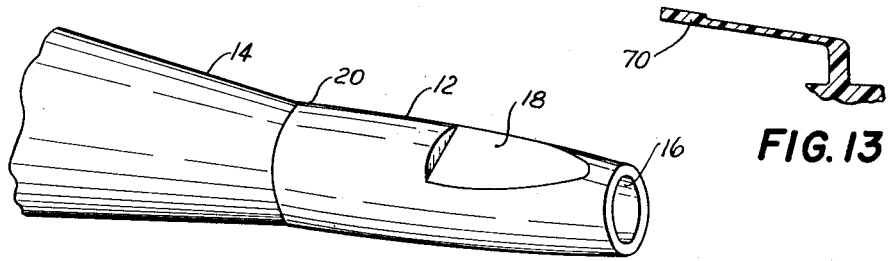
FIG. 13
FIG. 1
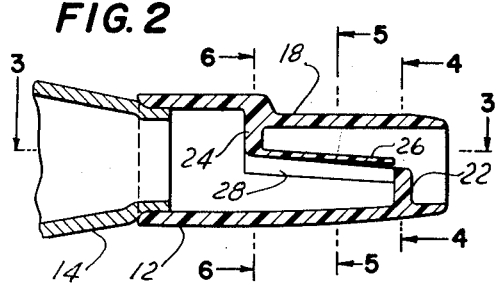
FIG. 2
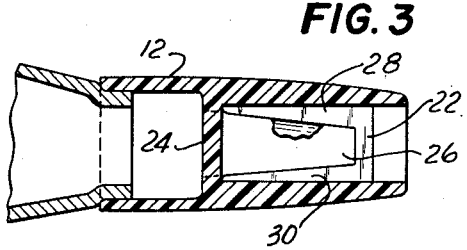
FIG. 3
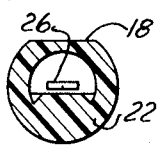
FIG. 4
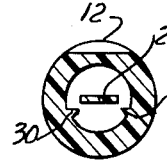
FIG. 5
FIG. 6
FIG. 9
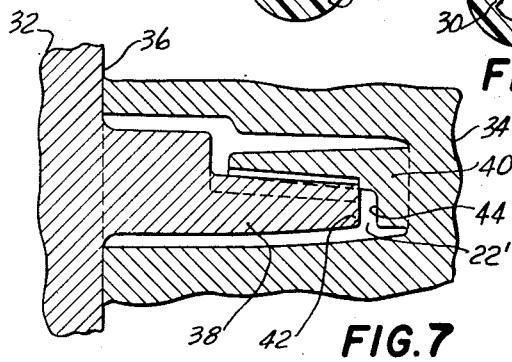
FIG. 7
FIG. 10
FIG. 11
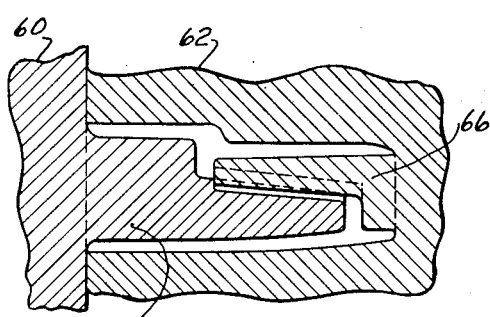
FIG. 12
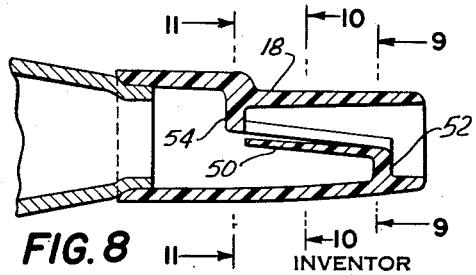
FIG. 8
INVENTOR
VICTOR T. HOEFLICH
BY James and Franklin
ATTORNEYS Aug. 19, 1952 — V. T. HOEFLICH — 2,607,162
MOUTHPIECE FOR SOUND-PRODUCING DEVICES
Filed Feb. 7, 1947 — 2 SHEETS—SHEET 2
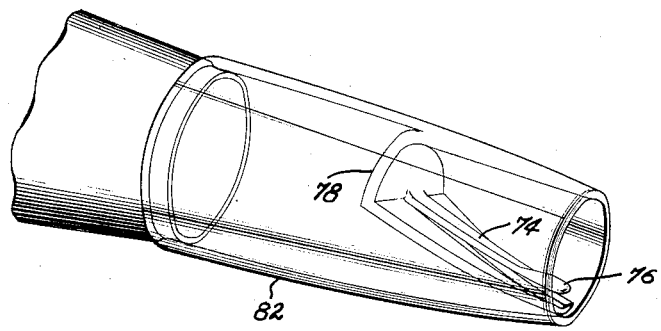
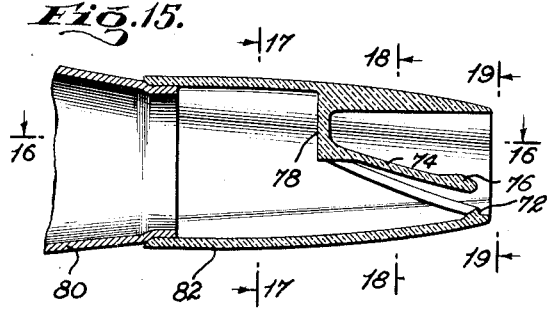
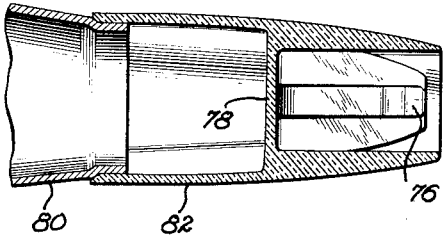
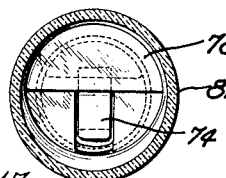
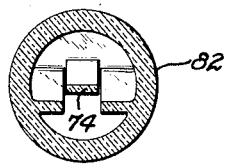
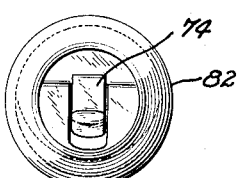
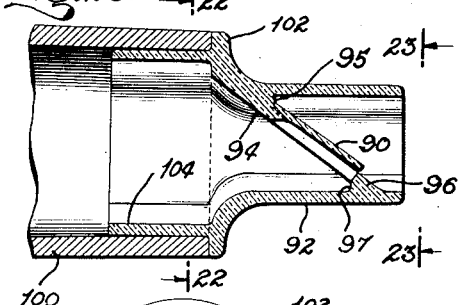
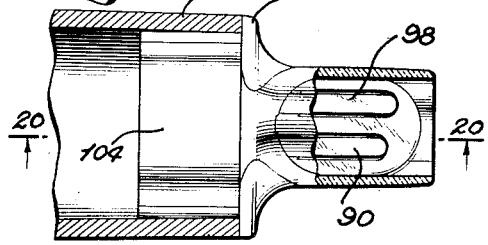
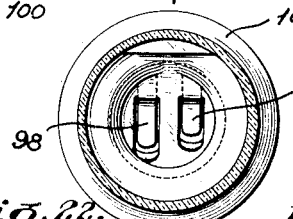
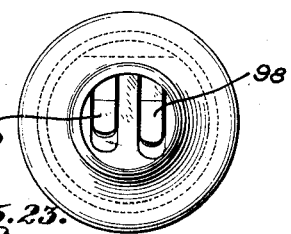
INVENTOR
VICTOR T. HOEFLICH
BY
ATTORNEY Patented Aug. 19, 1952

2,607,162

UNITED STATES PATENT OFFICE 2,607,162

MOUTHPIECE FOR SOUND-PRODUCING DEVICES

Victor T. Hoeflich, Bronx, N. Y.

Application February 7, 1947, Serial No. 726,983

2 Claims. (Cl. 46—181)

This invention relates to sound-producing devices, and more particularly to a mouthpiece for the same.

Heretofore, the mouthpiece for toy horns has been assembled out of a number of parts. One object of the present invention is to dispense with assembly operations, and to provide a simplified, inexpensive, one-piece mouthpiece. Another object is to provide a mouthpiece having improved sound. Still another object is to make possible some advance selection of the tone during manufacture, without changing the length of the reed.

The foregoing objects are accomplished by molding the entire mouthpiece, including the vibratile reed, the bridges between which the reed is located, and the ledges outside the reed, all out of a single piece of molding material. In accordance with a further feature and object of the invention, the mouthpiece is so designed that it may be molded between the halves of a simple, two-part mold using only fixed cores.

To accomplish the foregoing objects, and others which will hereinafter appear, my invention resides in the molded mouthpiece elements and their relation one to the other, as are hereinafter more particularly described in the following specification and sought to be defined in the appended claims. The specification is accompanied by a drawing, in which:

Fig. 1 is a perspective view of the mouthpiece end of a toy horn embodying features of my invention;

Fig. 2 is a longitudinal section taken in elevation through the same;

Fig. 3 is a horizontal section taken approximately in the plane of the line 3—3 of Fig. 2;

Fig. 4 is a transverse section through the bottom bridge, taken in the plane of the line 4—4 of Fig. 2;

Fig. 5 is a transverse section taken approximately in the plane of the line 5—5 of Fig. 2;

Fig. 6 is a transverse section through the top bridge, taken in the plane of the line 6—6 of Fig. 2;

Fig. 7 is a section through a mold for making the mouthpiece of Fig. 2;

Fig. 8 is a longitudinal section taken in elevation through a modified mouthpiece;

Fig. 9 is a transverse section through the bottom bridge, taken in the plane of the line 9—9 of Fig. 8;

Fig. 10 is a transverse section taken approximately in the plane of the line 10—10 of Fig. 8;

Fig. 11 is a transverse section through the top bridge, taken in the plane of the line 11—11 of Fig. 8;

Fig. 12 is a section through a mold for making the mouthpiece of Fig. 8;

Fig. 13 is explanatory of a detail of a modification of the invention;

Fig. 14 is a perspective view of a modification;

Fig. 15 is a longitudinal section through the modification of Fig. 14;

Fig. 16 is a horizontal section taken approximately in the plane of the line 16—16 of Fig. 15;

Figs. 17 and 18 are transverse sections taken approximately in the planes of the lines 17—17 and 18—18 respectively in Fig. 15;

Fig. 19 is an end elevation looking in the direction of the arrows 19—19 of Fig. 15;

Fig. 20 is a longitudinal section through still another modification of the invention, taken approximately in the plane of the line 20—20 of Fig. 21;

Fig. 21 is a partially sectioned plan view of the mouthpiece shown in Fig. 20;

Fig. 22 is a transverse section taken approximately in the plane of the line 22—22 of Fig. 20; and Fig. 23 is an end elevation looking in the direction of the arrows 23—23 of Fig. 20.

Referring to the drawings, and more particularly to Fig. 1, the toy horn comprises a mouthpiece 12 and a horn body 14. The mouthpiece 12 is generally tubular, and is tapered at 16 and may be flattened at 18 to better fit the mouth. The sound discharge end 20 is adapted to tightly receive the small end of a conical horn 14, usually made of paper, cardboard, or the like, although horns often are also made of metal. Plastic too may be used for the horn.

Referring now to Figs. 2 through 6, the mouthpiece comprises a tubular shell having a bottom bridge 22 near the mouth end of the shell, and a top bridge 24 nearer the sound discharge end of the shell, or spaced from the bottom bridge 22. A vibratile reed 26 is made of the same material as the shell 12 and the bridges 22 and 24, and is molded integrally therewith. In the present case the reed 26 is formed integrally with bridge 24, and extends toward bridge 22, and is free to vibrate relative to that bridge.

A pair of ledges 28 and 30 extend from bridge 22 to bridge 24, collaterally of reed 22. These ledges fill the space between the side edges of the reed and the tubular shell. The ledges as well as the bridges and reed are all molded integrally out of a suitable molding material, preferably a thermoplastic, for plastics have the advantage of attractive appearance, comfortable feel to the lips, high polish, lightweight, and low cost.

The manner in which the complete mouthpiece may be molded in a simple two-part mold is schematically illustrated in Fig. 7, showing die halves 32 and 34 separable on a parting face 36, and having fixed cores 38 and 40. The fixed core 40 forms the top and side edges of the reed, while the fixed core 38 forms the bottom of the reed. The cavity 22' for the bottom bridge 22 is formed by the end surface 42 of core 38 and the surface 44 at the base of core 40. The bottom or sloping walls of the ledges (28 and 30 in Figs. 2-6) are formed by chamfering the side edges of core 38, while the horizontal or top surfaces of the ledges are formed by the core 40. In other words, core 40 is upwardly channeled to form the reed cavity, and the core 38 is relieved at its sides to form the ledges.

Fig. 7 has been referred to as a "schematic drawing" because the cores 38 and 40 are drawn as though made integrally with the mold halves 32 and 34. In actual practice the cores may be made separately, and then fixed in the die halves, but they are nevertheless simple stationary cores in the sense that they are immovable in the die halves. There is no need for special collapsible cores, or retractable cores, with accompanying mechanism to operate the same relative to the die.

A modified mouthpiece is illustrated in Figs. 8 through 11. This differs from the mouthpiece of Fig. 2 primarily in that the reed 50 is formed integrally with the bottom bridge 52 and is movable relative to the top bridge 54. In this specification the terms "bottom bridge" and "top bridge" are used in a relative rather than an absolute sense. The significant thing is that one bridge is located at one side and the other is located on the other side of an approximately diametrical plane. That the terms have no significance in an absolute sense will be apparent when recalling that a toy horn may be rotated in the mouth of the user without in any way affecting its operation. In the specific mouthpiece here disclosed there is a "flat" at 18 which ordinarily would be located at the top, but the mouthpiece can be inverted, and might be designed with the flat on the opposite side from that shown, or for that matter with a flat on both sides.

The die for molding the mouthpiece of Fig. 8 is schematically illustrated in Fig. 12, it comprising die halves 60 and 62 with fixed cores 64 and 66 respectively. The core 64 is downwardly channeled to form a cavity for the reed, and the core 66 is relieved or chamfered at its side edges to form the ledges at the sides of the reed.

The ledges extend from one bridge to the other, as before, but if disposed beneath the reed they could not be tapered when viewed in plan, nor could the reed be tapered from the stationary toward the movable end when viewed in plan. To make it possible to withdraw the cores the tongue and ledges would have to have substantially parallel edges. However, the tongue and ledges may be taperel by locating the ledges above the tongue as here shown, instead of beneath the tongue, for in that case the ledges are formed by the core 66, and therefore may be wide at the top bridge and narrow at the bottom bridge. Since the tongue is formed by a channel cut downwardly into the core 64, it may be wide at its junction with the bottom bridge and narrow at its free end adjacent the top bridge.

In Fig. 12, as in Fig. 7, the cores 64 and 66 are again shown integrally with the die halves 60 and 62 in order to emphasize their fixed nature, but in actually building the die, may be made separately and then secured in the die.

One advantage of the molded reed is that the natural frequency of the reed may be varied by changing its thickness. Thus if a lower tone is wanted, the reed may be modified as shown in Fig. 13, it being thickened at the free end 70. For this purpose it is merely necessary to modify one of the cores, and if several kinds of mouthpiece are to be made differing only in tone, appropriate cores may be made and used in the same main die.

Figs. 14 through 19 show a modification of the invention, in which the slope of the reed is increased considerably. This has the advantage of making the cores of the die much more substantial, and of making retraction of the cores much easier. The increased slope is obtained by minimizing the dimension of one or both of the bridges. In the particular case here illustrated, the bottom bridge 72 (Fig. 15) is reduced almost to nothing. The reed 74 has a weighted end 76 to lower the pitch of the sound. The top bridge 78 is of substantial dimension, but it too may be reduced in dimension as, for example, if it is desired to increase the length of the reed.

As before, a cardboard or equivalent horn body 80 is inserted in the large end of the mouthpiece 82.

Still another modification of the invention is illustrated in Figs. 20 through 23 of the drawing. One change in this form of the invention is that both the top and bottom bridges are minimized in dimension or/and sloped at an angle. Thus, referring to Fig. 20, the reed 90 is disposed at an angle and extends substantially all the way from the top to the bottom of the mouthpiece 92, there being only a small bridge 94 at the stationary end of the reed, and another small bridge 96 at the movable end of the reed. One side of each bridge slopes, while the other side is filled in or filleted, as indicated at 95 and 97. This avoids feathering the cores of the die down to a sharp edge, which might weaken them at the tip. It is evident that the structure shown may be readily molded with sturdy and easily retractable cores.

Another difference in the modification of Figs. 20 through 23 is the use of multiple reeds in a single mouthpiece. Thus, referring to Figs. 21, 22 and 23, it will be seen that there is a reed 98, in addition to the reed 90 previously referred to. The two reeds are preferably made somewhat different in length, or/and are differently weighted, to produce tones which are harmonically related.

Still another difference in the modification of Figs. 20-23 is that the horn body 100 is received outside, rather than inside the mouthpiece. For this purpose, a flange 102 is preferably used, it being disposed between the mouthpiece portion 92 and the horn receiving portion 104. The horn 100 is received snugly around the portion 104, and is stopped and protected by the flange 102.

It is believed that the construction and method of molding the improved mouthpiece, as well as the advantages thereof, will be apparent from the foregoing detailed description. The mouthpiece is inexpensive to manufacture because no assembly operations are required. The mouthpiece may be molded between the halves of a simple two-part mold, and does not require complicated retractable cores. The plastic reed produces an improved sound, and the tone may be changed by modifying the thickness of the reed in order to weight the same and thereby vary its resonance frequency.

It will be understood that while I have shown and described my invention in several preferred forms, changes may be made in the structures disclosed without departing from the spirit of the invention as sought to be defined in the following claims. In the claims the expression "top bridge" and "bottom bridge" are used in a relative sense for convenience, and are not intended to exclude mouthpieces used in inverted position. The reference in the claims to top and bottom "bridges" is not intended to exclude the arrangements of Figs. 15 and 20 in which one or both bridges are reduced in size or/and sloped at an angle.

I claim:

1. A one-piece molded mouthpiece for a sound-producing device, said mouthpiece comprising a molded tubular shell shaped to provide a mouth end and a sound discharge end, a bottom bridge across the inside of the shell, a top bridge across the inside of the shell nearer the discharge end of the shell than is the bottom bridge, a thin vibratile reed formed integrally with the top bridge and extending substantially to a point over the bottom bridge, said reed extending in sloping direction from the top of the mouthpiece to the bottom of the mouthpiece, the top and bottom bridges being very small in dimension diametrically of the mouthpiece, and stationary ledges extending from one bridge to the other collaterally of the reed outside the sides of the reed, said shell, bridges, reed and ledges all being made of a single integrally molded body of plastic molding material.

2. A one-piece molded mouthpiece for a sound-producing device, said mouthpiece comprising a molded tubular shell shaped to provide a mouth end and a sound discharge end, a bottom bridge across the inside of the shell, a top bridge across the inside of the shell nearer the discharge end of the shell than is the bottom bridge, a plurality of thin vibratile reeds formed integrally with the top bridge and extending substantially to a point over the bottom bridge, said reeds extending in sloping direction from the top of the mouthpiece to the bottom of the mouthpiece, the top and bottom bridges being very small in dimension diametrically, and stationary ledges extending from one bridge to the other collaterally of the reeds at each side of the reeds, said reeds being disposed in side-by-side relation in a common plane and differing in dimension, said shell, bridges, reeds, and ledges all being made of a single integrally molded body of plastic molding material.

VICTOR T. HOEFLICH.

REFERENCES CITED

The following references are of record in the file of this patent:

UNITED STATES PATENTS

| Number | Name | Date |
|---|---|---|
| 550,751 | Freeman | Dec. 3, 1895 |
| 728,083 | Childers | May 12, 1903 |
| 751,153 | Eisenstein | Feb. 2, 1904 |
| 1,646,530 | Ferretti | Oct. 25, 1927 |
| 2,146,179 | Fitchhorn | Feb. 7, 1939 |
| 2,282,056 | Hoeflich | May 5, 1942 |
| 2,296,785 | Hoeflich | Sept. 22, 1942 |
| 2,296,786 | Hoeflich | Sept. 22, 1942 |
| 2,385,752 | Wilson | Sept. 25, 1942 |